US011310797B2

(12) United States Patent
Tsai

(10) Patent No.: US 11,310,797 B2
(45) Date of Patent: Apr. 19, 2022

(54) CHANNEL POLLING FOR MULTI-FREQUENCY BAND ANTENNA TUNING

(71) Applicant: HEWLETT-PACKARD DEVELOPMENT COMPANY, L.P., Houston, TX (US)

(72) Inventor: Ming-Shien Tsai, Taipei (TW)

(73) Assignee: Hewlett-Packard Development Company L.P., Spring, TX (US)

( * ) Notice: Subject to any disclaimer, the term of this patent is extended or adjusted under 35 U.S.C. 154(b) by 737 days.

(21) Appl. No.: 16/076,907

(22) PCT Filed: Apr. 17, 2017

(86) PCT No.: PCT/US2017/027841
§ 371 (c)(1),
(2) Date: Aug. 9, 2018

(87) PCT Pub. No.: WO2018/194536
PCT Pub. Date: Oct. 25, 2018

(65) Prior Publication Data
US 2021/0204287 A1   Jul. 1, 2021

(51) Int. Cl.
*H04W 72/04*   (2009.01)
*H04B 17/318*   (2015.01)
(Continued)

(52) U.S. Cl.
CPC ...... *H04W 72/0453* (2013.01); *H04B 17/318* (2015.01); *H04W 72/02* (2013.01); *H04W 72/08* (2013.01)

(58) Field of Classification Search
CPC . H04W 72/02; H04W 72/08; H04W 72/0453; H04B 17/318
See application file for complete search history.

(56) References Cited

U.S. PATENT DOCUMENTS

| 6,219,549 B1 | 4/2001 | Tat |
| 6,456,652 B1 | 9/2002 | Kim et al. |

(Continued)

FOREIGN PATENT DOCUMENTS

| CN | 1653838 A | 8/2005 |
| CN | 101742534 A | 6/2010 |

(Continued)

OTHER PUBLICATIONS

Cihangir et al., "Utilization of Tunable Components for 4G Frequency Reconfigurable Mobile Terminal Antenna", International Workshop on Antenna Technology: Small Antennas, Novel EM Structures and Materials, and Applications (iWAT), 2014, 3 pages.

*Primary Examiner* — Rhonda L Murphy
(74) *Attorney, Agent, or Firm* — HPI Patent Department

(57) ABSTRACT

In one example, a communication device is disclosed, which includes a tunable circuit coupled to an antenna, a modem, and a control unit. The modem may poll a plurality of channels. Each channel is associated with a frequency band. Further, the modem may record a received signal strength indicator (RSSI) value associated with each of the plurality of channels. Furthermore, the control unit may determine a first channel having a highest RSSI value from the plurality of channels and control the tunable circuit to tune the antenna based on a frequency of the first channel.

13 Claims, 5 Drawing Sheets

(51) Int. Cl.
*H04W 72/02* (2009.01)
*H04W 72/08* (2009.01)

(56) References Cited

U.S. PATENT DOCUMENTS

| | | | |
|---|---|---|---|
| 7,158,759 | B2 | 1/2007 | Hansen et al. |
| 8,391,862 | B1 | 3/2013 | Harju et al. |
| 8,417,239 | B1 * | 4/2013 | DeCusatis ............. H04W 24/08 |
| | | | 455/423 |
| 9,301,307 | B1 | 3/2016 | Park et al. |
| 9,496,901 | B2 | 11/2016 | Wehrmann et al. |
| 10,123,214 | B2 * | 11/2018 | Egner ................... H04W 28/08 |
| 2003/0181211 | A1 * | 9/2003 | Razavilar .............. H04W 16/10 |
| | | | 455/450 |
| 2009/0311982 | A1 * | 12/2009 | Zhang ................... H03J 1/0091 |
| | | | 455/161.3 |
| 2012/0214421 | A1 * | 8/2012 | Hoirup .................. H04B 1/401 |
| | | | 455/67.11 |
| 2014/0030987 | A1 | 1/2014 | Man |
| 2016/0173172 | A1 | 6/2016 | Greene |
| 2016/0241279 | A1 * | 8/2016 | Yang ................... H04B 1/0475 |

FOREIGN PATENT DOCUMENTS

| | | |
|---|---|---|
| CN | 103391142 | 11/2013 |
| CN | 105024726 A | 11/2015 |
| CN | 105191152 A | 12/2015 |

\* cited by examiner

| FREQUENCY BAND | CHANNEL | RSSI VALUE |
|---|---|---|
| FREQUENCY BAND 1 | CHANNEL 1 | -150 |
| | CHANNEL 2 | -100 |
| FREQUENCY BAND 2 | CHANNEL 3 | -75 |
| | CHANNEL 4 | -70 |
| FREQUENCY BAND 3 | CHANNEL 5 | -80 |
| | CHANNEL 6 | -90 |

| FREQUENCY BAND | CHANNEL | RSSI VALUE T0 | RSSI VALUE T1 | RSSI VALUE T2 | RSSI VALUE T3 | RSSI VALUE T4 |
|---|---|---|---|---|---|---|
| FREQUENCY BAND 2 | CHANNEL 4 | -70 | -75 | -80 | -100 | -102 |

CHANNEL POLLING FOR MULTI-FREQUENCY BAND ANTENNA TUNING

BACKGROUND

Wireless communication devices, such as mobile phones, may have antennas for transmitting and receiving signals. For signal transmission, a communication device may transmit a Radio Frequency (RF) signal via an antenna to a base station. For signal reception, the communication device may receive a RF signal via the antenna to recover data sent by the base station.

BRIEF DESCRIPTION OF THE DRAWINGS

Examples are described in the following detailed description and in reference to the drawings, in which:

FIG. 4A illustrates a table depicting example RSSI values of each channel associated with the frequency bands as shown in FIG. 3;

FIG. 4B illustrates a table depicting an example updated RSSI values of a first channel that is selected for routing signals to/from the communication device;

DETAILED DESCRIPTION

Wireless communication devices may use antennas to transmit and/or receive RF signals. Example antenna may be "a multi-band antenna" and/or "multiple antennas" that support multiple frequency bands. Each frequency band may include a range of frequencies that correspond to a set of RF channels. Example frequency bands may include Global System for Mobile communications (GSM) bands, Universal Mobile Telecommunications System (UMTS) bands, Long Term Evolution (LTE) bands, and the like. A communication device may utilize one of the RF channels to communicate with a base station. To access the RF channel within a frequency band, the antenna may be tuned to match an operating frequency of the RF channel.

While routing signals through the RF channel, channel interference may be detected that may result in reducing the received signal strength indictor (RSSI) value of the RF channel to fall below an acceptable level. The term "RSSI value" may refer to a value or measure which indicates the transmission power level associated with the channel. In this case, communication device may switch operation or request a switch of operation to another RF channel. However, the new RF channel may not support transmission at a higher power level as the previous channel, which may cause the communication device to lose connectivity.

Further, to access the new RF channel, the antenna may need to be re-tuned to an operating frequency of the new RF channel. However, tunable antenna solution (i.e., tuning/re-tuning) may involve a complex physical layer support which may need significant effort on development/deployment of a modem application. In some cases, non-mobile manufacture may be obviated from using such tunable antenna solution.

Examples described herein may provide a communication device to perform channel polling for tuning a multi-frequency band antenna. The communication device may include an antenna, a tunable circuit coupled to the antenna, a modem, and a control unit. The modem may poll multiple channels. Each channel is associated with a frequency band. Further, the modem may record an RSSI value associated with each of the channels. Furthermore, the control unit may determine a first channel having a highest RSSI value from the channels and control the tunable circuit to tune the antenna based on a frequency of the first channel. Examples described herein may eliminate a need for a modem application (e.g., customer application) on modem cards for tuning the antenna.

Figure 1:
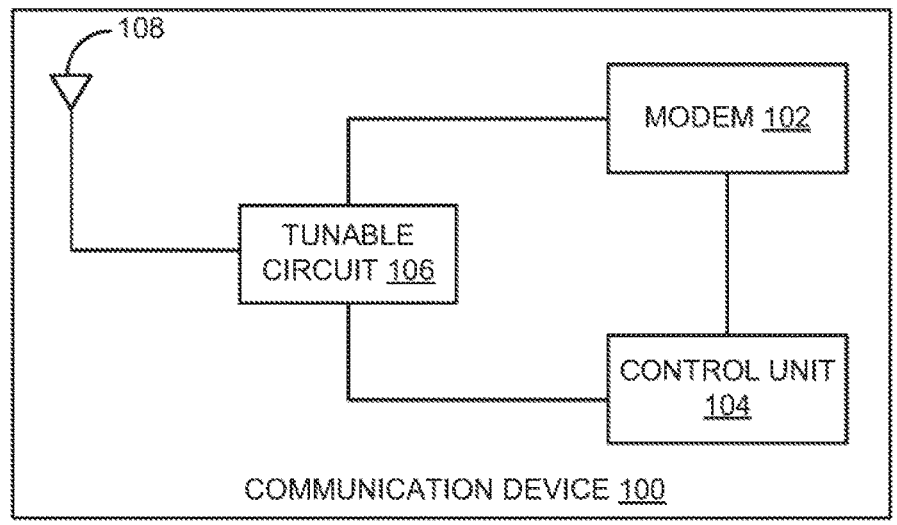
FIG. 1 is a block diagram of an example communication device including a control unit for antenna tuning.

Turning now to figures, FIG. 1 is a block diagram of an example communication device 100. Example communication device 100 may include a mobile phone, a tablet, a laptop, a desktop computer, a personal computer (PC), and the like. Further, communication device 100 may support communication capability provided by one of a Subscriber Identification Module (SIM), a Universal Integrated Circuit Card (UICC), a Universal Subscriber Identity Module (USIM), an Internet protocol multimedia Services Identity Module (I-SIM), a Removable User Identity Module (R-UIM), a Code Division Multiple Access (CDMA) Subscriber Identity Module (CSIM), and/or a Willcom-SIM (W-SIM).

As shown in FIG. 1, communication device 100 may include a modem 102, a control unit 104, an antenna 108, and a tunable circuit 106 coupled to antenna 108. Tunable circuit 106 may be used to tune antenna 108 to operate in different frequency bands such as GSM bands, UMTS bands, LTE bands, and the like. For example, modem 102 may be a transceiver that can transmit and receive data. During operation, modem 102 may poll a plurality of channels, each channel associated with a frequency band. The term 'polling' may refer to channel polling that is performed to check activity/availability of each channel before initiation of reception/transmission over a channel. For example, channel polling may use low power listening (LPL) approach for polling the channel activity without transmitting/receiving data. In one example, control unit 104 may trigger modem 102 to initiate the polling of the channels. Further, modem 102 may record an RSSI value associated with each of the channels in response to the channel polling.

During operation, control unit 104 may receive the RSSI values associated with the channels from modem 102 via a communication interface (e.g., universal serial bus (USB)). Further, control unit 104 may determine a first channel having a highest RSSI value from the multiple channels. In one example, control unit 104 may compare the RSSI value associated with each of the channels with a threshold value. The threshold value may be an acceptable RSSI value that is operable to route signals over a channel. Example RSSI value may be measured in decibels (dB). In one example, the threshold value may be variably set in accordance to a type of communication (e.g., voice communication, data communication, and the like).

Further, control unit 104 may determine a set of channels having RSSI values greater than the threshold value. Furthermore, control unit 104 may select the first channel having the highest RSSI value from the set of channels. In addition, control unit 104 may control tunable circuit 106 to tune antenna 108 based on a frequency of the first channel. In one example, control unit 104 may control tunable circuit 106 to match an operating frequency of antenna 108 to the frequency of the first channel. Upon tuning antenna 108 to the frequency of the first channel, modem 102 may dynamically update the RSSI value associated with the first channel at time intervals (e.g., periodic time intervals).

In one example, control unit 104 may determine whether the updated RSSI value of the first channel is less than the threshold value. When the updated RSSI value of the first channel is less than the threshold value, control unit 104 may enable modem 102 to repeat the steps of polling the channels and recording RSSI values associated with the channels. Further, control unit 104 may determine a second channel having a highest RSSI value from the currently recorded RSSI value associated with channels. Furthermore, control unit 104 may control tunable circuit 106 to tune antenna 108 based on a frequency of the second channel. The processes performed by control unit 104 are explained in detail in FIGS. 3, 4A and 4B.

In another example, control unit 104 may trigger modem 102 to initiate the polling of the channels based on a region code parameter associated with communication device 100 when the RSSI value of each of the channels is less than a threshold value. For example, control unit 104 may be implemented as a part of a central processing unit (CPU) or may be implemented as a separate unit coupled to the CPU (as shown in FIG. 2) through a communication interface (e.g., USS).

Figure 2:
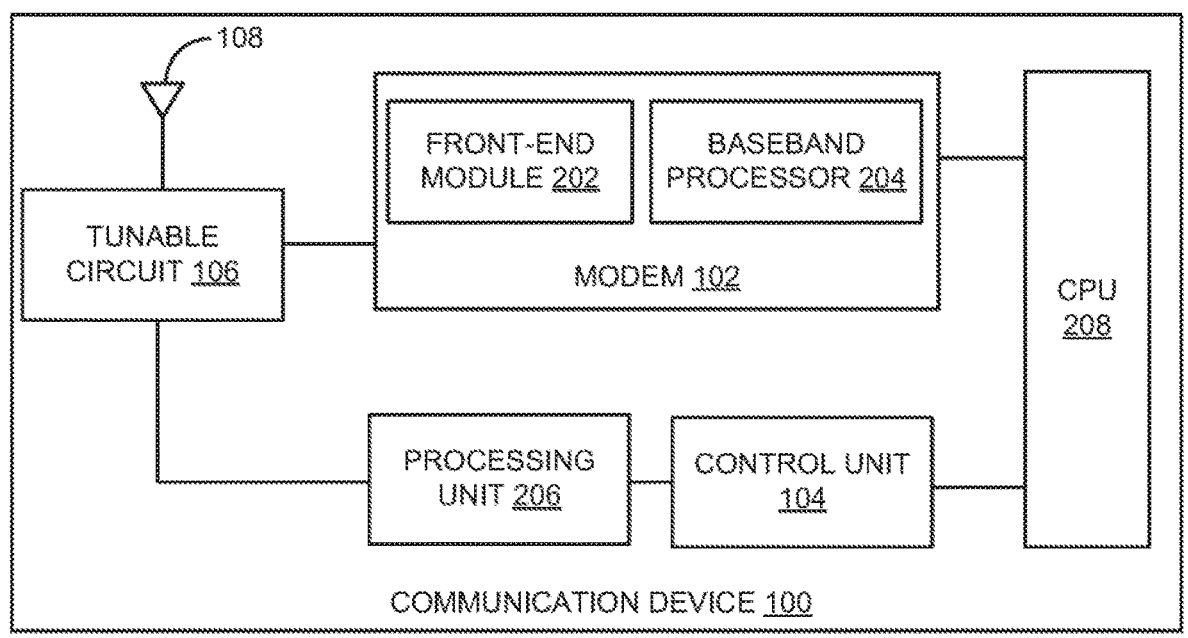
FIG. 2 is another block diagram of the example communication device as shown in FIG. 1, including additional components.

FIG. 2 is another block diagram of example communication device 100 of FIG. 1, including additional components. As shown in FIG. 2, communication device 100 may include a CPU 208 communicatively connected to control unit 104. Example control unit 104 may be an embedded controller that may automatically trigger the channel polling or a keyboard controller that may trigger the channel polling upon receiving a user input command.

CPU 208 or control unit 104 may trigger modem 102 to poll a plurality of channels. As shown in FIG. 2, modem 102 may include a front-end module 202 and a baseband processor 204. Front-end module 202 may include a switch to operate antenna 108 in transmit mode or receive mode when channel polling is triggered. In some examples, front-end module 202 may also include components such as filters, low-noise amplifiers, and/or down-conversion mixers needed to process the signal at the original incoming radio frequency, before the signal is converted to a lower intermediate frequency (IF). Baseband processor 204 may include logic, circuitry, and/or code that may be enabled to process baseband signals during transmission or reception.

During operation, baseband processor 204 may request channels for communication. Further, baseband processor 204 may receive RSSI values associated with the channels in each frequency band in response to the polling. Further during operation, CPU 208 may obtain the RSSI values associated with the channels from baseband processor 204 via a first communication interface. Further, CPU 208 may determine a channel having a highest RSSI value using the obtained RSSI values. Furthermore, CPU 208 may instruct control unit 104, via a second communication interface, to tune antenna 108 using a frequency of the determined channel.

Control unit 104 may control tunable circuit 106 to match an operating frequency of antenna 108 to the frequency of the determined channel. In one example, control unit 104 may provide control signal to tunable circuit 106 through a processing unit 206. Example processing unit 206 may include digital-to-analog converter that receives a digital signal (i.e., control signal) from control unit 104 and provide an equivalent analog signal to tunable circuit 106 for tuning antenna 108.

Control unit 104 may include, for example, hardware devices including electronic circuitry for implementing the functionality described herein. In addition or as an alternative, control unit 104 may be implemented as a series of instructions encoded on a machine-readable storage medium of communication device 100 and executable by processor. In examples described herein, the processor may include, for example, one processor or multiple processors included in a single device or distributed across multiple devices. It should be noted that, in some embodiments, some modules are implemented as hardware devices, while other modules are implemented as executable instructions.

Figure 3:
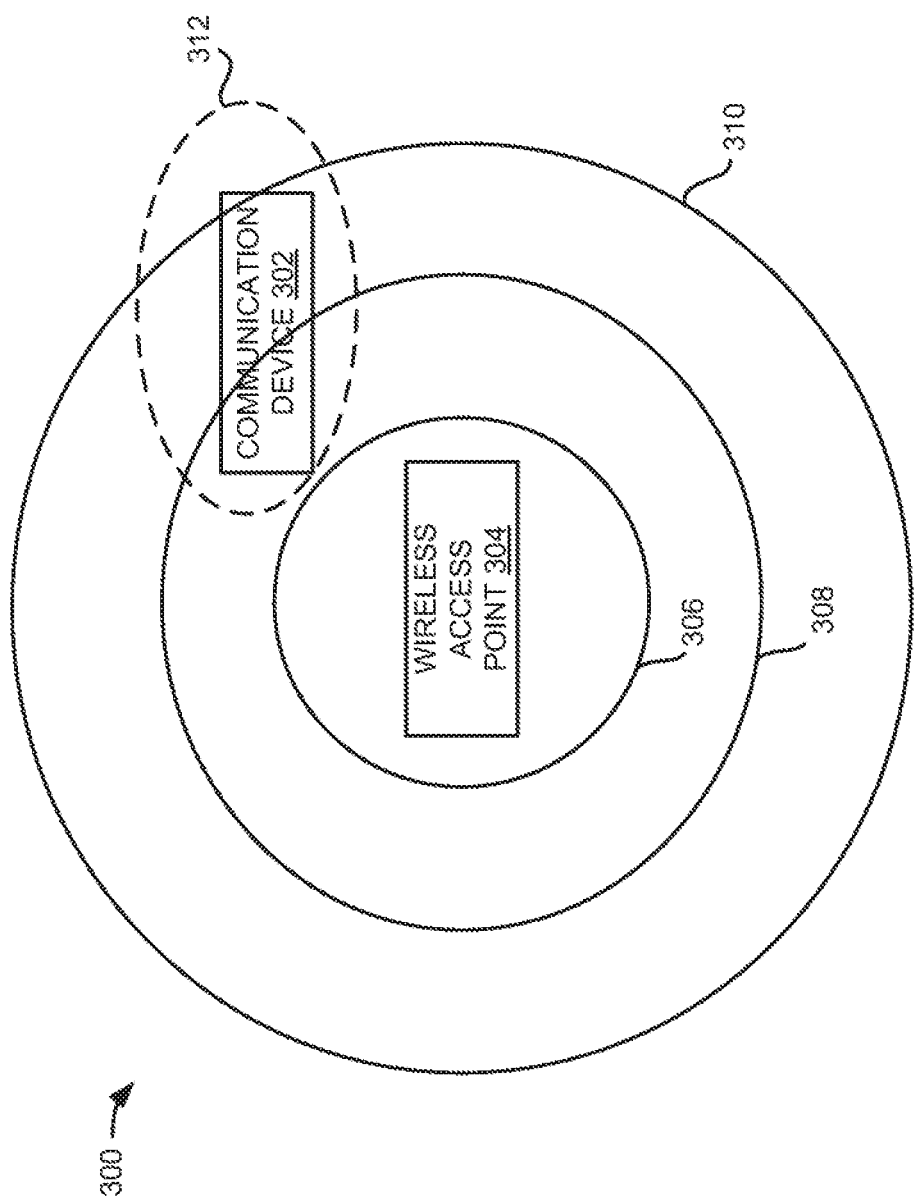
FIG. 3 is an example schematic illustrating a communication device having an antenna that is tuned to match one of frequency bands.

FIG. 3 is an example schematic 300 illustrating a communication device 302 having an antenna that is tuned to match one of a plurality of frequency bands 306-310. FIG. 4A illustrates a table 400A depicting example RSSI values of channels 1-6 associated with each frequency band 306-310. As shown in FIG. 3, wireless access point 304 (e.g., a base station) may utilize one of frequency bands 306-310 to communicate with communication device 302 (e.g., tablet with SIM capability for voice/data communication).

As shown in FIG. 4A, frequency bands 306-310 may include associated channels 1-6 having different power levels (i.e., RSSI values as shown in FIG. 4A) corresponding to communication device 302. Example channels 1-6 may include RSSI values that may vary from 0 dB to −150 dB. For this example, consider a threshold value as −100 dB that is an acceptable RSSI value to route signals over a channel. In this case, channels having RSSI value above −100 dB and closer to 0 dB may route signals at a higher power level and channels having RSSI value below −100 dB may route signals at a lower power level. For initiating transmission/reception between communication device 302 and access point 304 through a channel, control unit of communication device 302 may perform the following:

I. trigger a modem to poll channels 1-6 associated with respective frequency bands 306-310;
    II. receive an RSSI value associated with channels 1-6 from the modem;
    III. compare the RSSI value associated with channels 1-8 with the threshold value (i.e., −100 dB);
    IV. determine channels 3-6 having RSSI value greater than the threshold value;
    V. determine channel 4 having a highest RSSI value (e.g., −70 dB) among channels 3-6;
    VI. adjust a tunable circuit to tune an operating frequency of the antenna to a frequency of channel 4.

Further as shown in table 400B of FIG. 4B, modem may dynamically update the RSSI value associated with channel 4 at time intervals (T0-T4). Consider at time interval T4, an interference cloud 312 may degrade the RSSI value of channel 4, in this case, control unit may perform a channel switching operation as follows;

I. determine whether the updated RSSI value of channel 4 is less than the threshold value (i.e., −100 dB);
    II. when the RSSI value of channel 4 falls below the threshold value (e.g., at time interval T4), trigger a modem to perform channel polling;
    III. enable the modem to receive an RSSI value associated with each of the channels 1-6 that are polled (e.g., at/after time interval T4);

IV. determine a new channel having a highest RSSI value that is above the threshold value using the RSSI values associated with channels 1-6 that are polled (e.g., at/after time interval T4);

V. adjust a tunable circuit to tune an operating frequency of the antenna to a frequency of the new channel.

Further, for the aforementioned example, consider communication device 302 loses coverage from full band scan (FBS) of supported bands (i.e., during roaming). Thereby, RSSI values associated with frequency bands are lower as compared to the threshold value. In this case, communication device 302 may trigger a modem to poll channels based on a region code parameter associated with communication device 302. Example region code parameter may be associated with UIM/SIM of communication device 302. In one example, frequency ranges associated with a base station in a geographic region where communication device 302 is located may be polled based on the region code parameter that indicate the geographic region.

Figure 5:
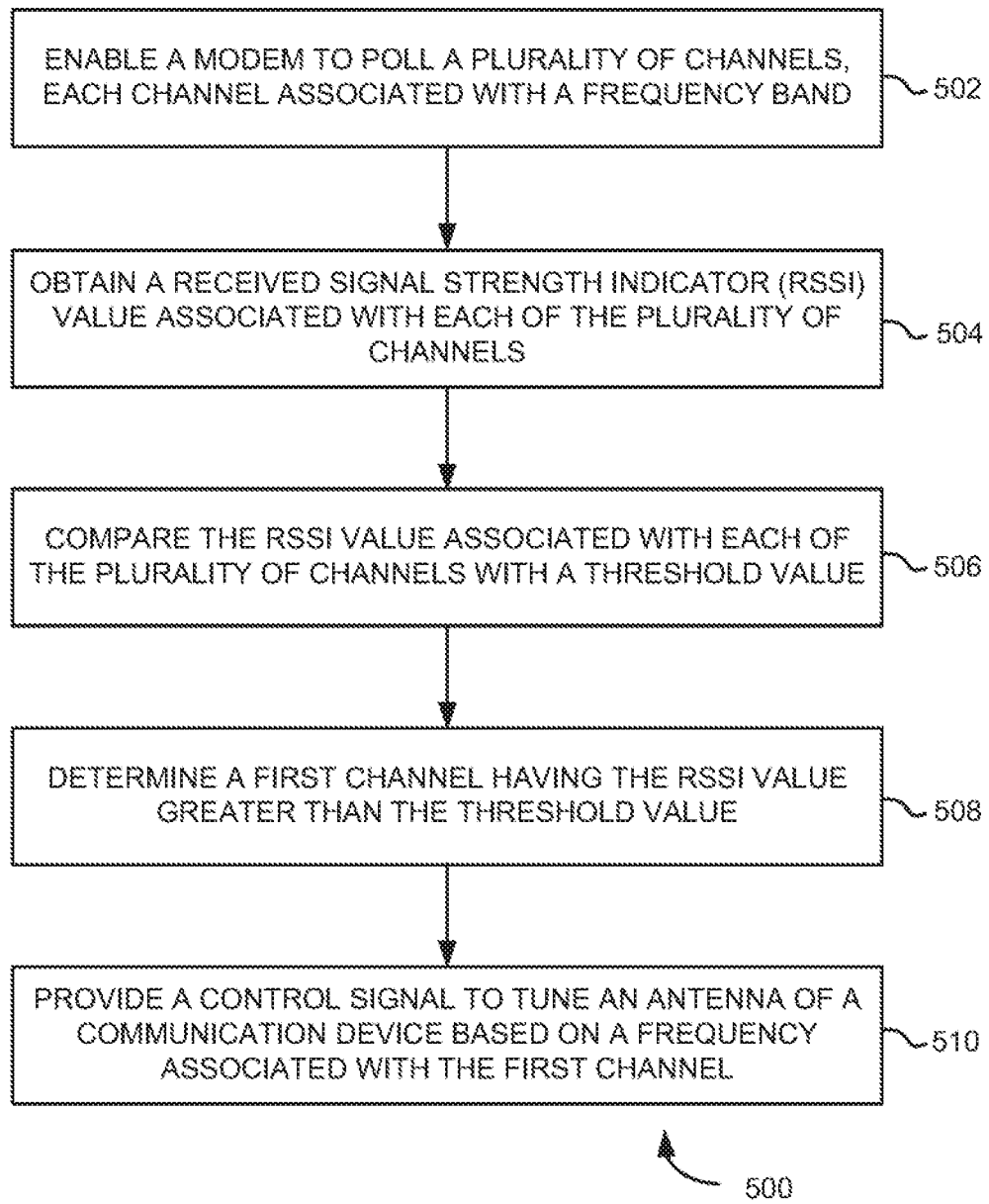
FIG. 5 depicts an example flow chart for tuning a multi-frequency band antenna.

FIG. 5 depicts an example flow chart 500 for tuning multi-band antenna. It should be understood that the process depicted in FIG. 5 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate software, or use a combination of hardware and software to perform the illustrated processes.

At 502, a modem may be enabled to poll a plurality of channels. In one example, each channel may be associated with a frequency band. At 504, a RSSI value associated with each of the channels may be obtained. At 506, the RSSI value associated with each of the channels may be compared with a threshold value. At 508, a first channel having the RSSI value greater than the threshold value may be determined. In one example, the first channel having the highest RSSI value may be determined from the channels. At 510, a control signal may be provided to tune an antenna of a communication device based on a frequency associated with the first channel.

Further, the RSSI value associated with the first channel may be dynamically updated over time intervals. Furthermore, a check may be made to determine whether the updated RSSI value of the first channel is less than the threshold value. When the updated RSSI value of the first channel is not less than the threshold value, the antenna may be operated based on the frequency associated with the first channel. When the updated RSSI value of the first channel is less than the threshold value, the steps of 502-510 may be repeated to determine a second channel for tuning the antenna.

When the RSSI value of each of the channels is less than the threshold value, the modem may be enabled to initiate the polling of the channels based on a region code parameter associated with the communication device.

Figure 6:
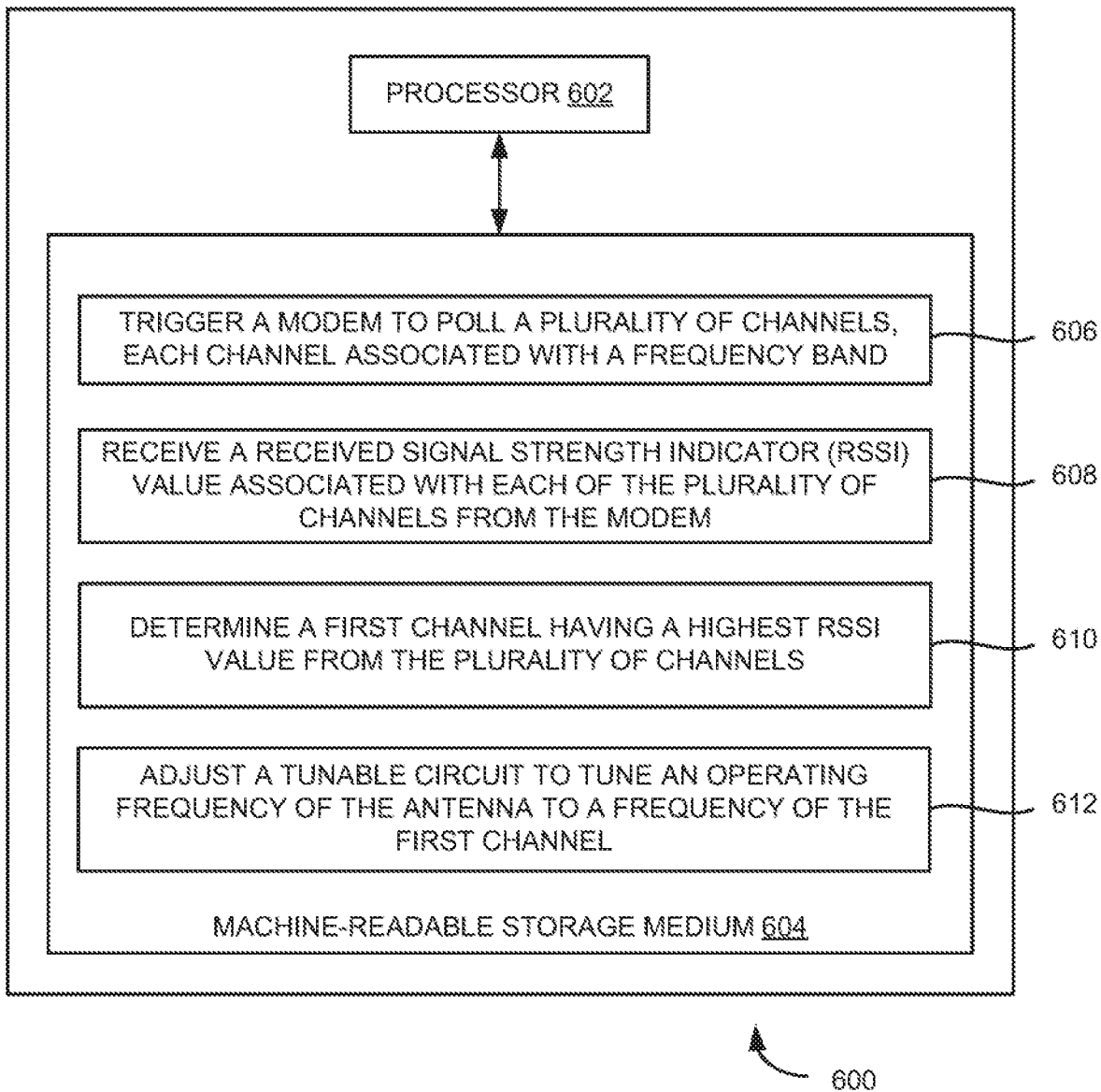
FIG. 6 depicts an example block diagram showing a non-transitory computer-readable medium to tune a multi-frequency band antenna.

FIG. 6 depicts a block diagram of a computing device 600 to tune multi-band antenna. Computing device 600 (e.g., communication device 100 as shown in FIGS. 1 and 2) may include a processor 602 and a machine-readable storage medium 604 communicatively coupled through a system bus. Processor 602 may be any type of central processing unit (CPU), microprocessor, or processing logic that interprets and executes machine-readable instructions stored in machine-readable storage medium 604. Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to computing device 600.

Machine-readable storage medium 604 may store instructions 606-612. In an example, instructions 606-612 may be executed by processor 602 to tune multi-band antenna. Instructions 606 may be executed by processor 602 to trigger a modem to poll channels, each channel associated with a frequency band. Instructions 608 may be executed by processor 602 to receive an RSSI value associated with each of the channels from the modem.

Instructions 610 may be executed by processor 602 to determine a first channel having a highest RSSI value from the channels. Instructions 612 may be executed by processor 602 to adjust a tunable circuit to tune an operating frequency of the antenna to a frequency of the first channel. In one example, a control unit may be instructed to adjust the tunable circuit to match the operating frequency of the antenna to the frequency of the first channel.

Further, an updated RSSI value of the first channel may be dynamically received from the modem. Furthermore, a check is made to determine whether the updated RSSI value of the first channel is less than the threshold value. When the updated RSSI value of the first channel is less than the threshold value, the operating frequency of the antenna may be switched. In one example, the operating frequency of the antenna may be switched by repeating the steps of channel polling and RSSI value recording to determine a second channel. Further, the control unit may be instructed to adjust the tunable circuit to tune the operating frequency of the antenna to a frequency of the second channel when the updated RSSI value of the first channel is less than the threshold value.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise"

or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A communication device, comprising:
   a tunable circuit coupled to an antenna;
   a modem to:
      poll a plurality of channels, each channel associated with a frequency band; and
      record a received signal strength indicator (RSSI) value associated with each of the plurality of channels; and
   a control unit to:
      determine a first channel having a highest RSSI value from the plurality of channels;
      control the tunable circuit to tune the antenna based on a frequency of the first channel; and
      trigger the modem to initiate the polling of the plurality of channels based on a region code parameter associated with the communication device when the RSSI value of each of the plurality of channels is less than a threshold value,
      wherein frequency ranges associated with a base station in a geographic region where the communication device is located are polled based on the region code parameter that indicates the geographic region.

2. The communication device of claim 1, wherein the control unit is to control the tunable circuit to match an operating frequency of the antenna to the frequency of the first channel.

3. The communication device of claim 1, wherein the control unit is to:
   compare the RSSI value associated with each of the plurality of channels with the threshold value;
   determine a set of channels having RSSI value greater than the threshold value; and
   select the first channel having the highest RSSI value from the set of channels.

4. The communication device of claim 3, wherein the modem is to dynamically update the RSSI value associated with the first channel at time intervals.

5. The communication device of claim 4, wherein the control unit is to:
   determine whether the updated RSSI value of the first channel is less than the threshold value; and
   repeat the steps of claim 1 to determine a second channel having a highest RSSI value when the updated RSSI value of the first channel is less than the threshold value.

6. A method comprising:
   enabling a modem to poll a plurality of channels, each channel associated with a frequency band;
   obtaining a received signal strength indicator (RSSI) value associated with each of the plurality of channels;
   comparing the RSSI value associated with each of the plurality of channels with a threshold value;
   determining a first channel having the RSSI value greater than the threshold value;
   providing a control signal to tune an antenna of a communication device based on a frequency associated with the first channel; and
   enabling the modem to initiate the polling of the plurality of channels based on a region code parameter associated with the communication device when the RSSI value of each of the plurality of channels is less than the threshold value,
   wherein frequency ranges associated with a base station in a geographic regio where the communication device is located are polled based on the region code paramenter that indicates the geographic region.

7. The method of claim 6, wherein determining the first channel having the RSSI value greater than the threshold value comprises:
   determining the first channel having the highest RSSI value from the plurality of channels.

8. The method of claim 6, wherein the RSSI value associated with the first channel is dynamically updated over time intervals.

9. The method of claim 8, comprising:
   determining whether the updated RSSI value of the first channel is less than the threshold value; and
   repeat the steps of claim 6 to determine a second channel for tuning the antenna when the updated RSSI value of the first channel is less than the threshold value.

10. A non-transitory computer-readable storage medium comprising instructions that, when executed by a processor, cause the processor to:
    trigger a modem to poll a plurality of channels, each channel associated with a frequency band;
    receive a received signal strength indicator (RSSI) value associated with each of the plurality of channels from the modem;
    determine a first channel having a highest RSSI value from the plurality of channels;
    adjust a tunable circuit to tune an operating frequency of the antenna to a frequency of the first channel; and
    trigger the modem to initiate the polling of the plurality of channels based on a region code parameter associated with the communication device when the RSSI value of each of the plurality of channels is less than a threshold value,
    wherein frequency ranges associated with a base station in a geographic region where the communication device is located are polled based on the region code parameter that indicates the geographic region.

11. The non-transitory computer-readable storage medium of claim 10, comprising instructions to:
    instruct a control unit to adjust the tunable circuit to match the operating frequency of the antenna to the frequency of the first channel.

12. The non-transitory computer-readable storage medium of claim 10, comprising instructions to:
    dynamically receive an updated RSSI value of the first channel from the modem;
    determine whether the updated RSSI value of the first channel is less than the threshold value; and
    switch the operating frequency of the antenna when the updated RSSI value of the first channel is less than the threshold value.

13. The non-transitory computer-readable storage medium of claim 12, wherein switching the operating frequency of the antenna, comprises:
    repeat the steps of claim 10 to determine a second channel and adjust the tunable circuit to tune the operating frequency of the antenna to a frequency of the second channel when the updated RSSI value of the first channel is less than the threshold value.

* * * * *